United States Patent [19]

Nicholson et al.

[11] Patent Number: 4,497,769
[45] Date of Patent: Feb. 5, 1985

[54] PORTABLE INSTRUMENT FOR INSPECTING IRRADIATED NUCLEAR FUEL ASSEMBLIES

[75] Inventors: Nicholas Nicholson; Edward J. Dowdy; David M. Holt, all of Los Alamos; Charles J. Stump, Jr., Santa Fe, all of N. Mex.

[73] Assignee: The United States of America as represented by the United States Department of Energy, Washington, D.C.

[21] Appl. No.: 377,773

[22] Filed: May 13, 1982

[51] Int. Cl.$^3$ .......................... G21C 17/00; G01T 1/22
[52] U.S. Cl. ..................................... 376/257; 250/362; 250/391
[58] Field of Search .............................. 376/251, 257; 250/361 R, 362, 391

[56] References Cited
U.S. PATENT DOCUMENTS
4,389,568  6/1983  Dowdy ............................... 376/257

OTHER PUBLICATIONS

Nucl. Instr. Meth. 173, No. 2 (1980), pp. 251–257, S04700062, Nemethyl et al., "Water Cherenkov Neutrino Detector."

Primary Examiner—Sal Cangialosi
Attorney, Agent, or Firm—William A. Eklund; Paul D. Gaetjens

[57] ABSTRACT

A portable instrument for measuring induced Cerenkov radiation associated with irradiated nuclear fuel assemblies in a water-filled storage pond is disclosed. The instrument includes a photomultiplier tube and an image intensifier which are operable in parallel and simultaneously by means of a field lens assembly and an associated beam splitter. The image intensifier permits an operator to aim and focus the apparatus on a submerged fuel assembly. Once the instrument is aimed and focused, an illumination reading can be obtained with the photomultiplier tube. The instrument includes a lens cap with a carbon-14/phosphor light source for calibrating the apparatus in the field.

12 Claims, 3 Drawing Figures

PORTABLE INSTRUMENT FOR INSPECTING IRRADIATED NUCLEAR FUEL ASSEMBLIES

This invention is a result of a contract with the Department of Energy (Contract No. W-7405-ENG-36).

BACKGROUND OF THE INVENTION

The invention disclosed herein is generally related to photometric instruments and, more specifically, to instruments for measuring the intensity of Cerenkov radiation in water-filled nuclear fuel storage ponds.

Nuclear reactor fuel is ordinarily contained in what are known as nuclear fuel assemblies. Such fuel assemblies are the basic fuel units which are loaded into a nuclear reactor core and removed at a later date when the nuclear fuel is spent. A typical fuel assembly consists of a bundle of up to several hundred parallel fuel rods. Each fuel rod consists of a metal tube loaded with nuclear reactor fuel. The fuel rods are spaced from one another to permit circulation of coolant water through the fuel assembly, and also in accordance with design considerations related to the power output of the reactor.

When a fuel assembly is removed from the reactor core at the end of a fuel cycle, the spent fuel is highly radioactive and continues to produce a substantial amount of heat and radiation for a number of months. Accordingly, the fuel assemblies are stored in water-filled storage ponds until such time as the spent fuel can be safely reprocessed or permanently disposed of. However, both reprocessing and permanent disposal of spent nuclear fuel are, for the most part, presently being held in abeyance pending the resolution of complex technical and political issues. As a result, large quantities of spent nuclear fuel are accumulating in storage ponds throughout the world, and will continue to accumulate in the forseeable future.

The spent nuclear fuel includes both fissile material and nonfissile fission products. The fissile material consists primarily of unburned fissile fuel, mostly $U^{235}$; and fissile $Pu^{239}$, which is formed by neutron capture in fertile $U^{238}$ originally present in the nuclear fuel. Both $U^{235}$ and $Pu^{239}$ are special nuclear materials and as such are potential targets of attempted wrongful diversion for the purpose of making nuclear weapons. To deter attempts at such diversion, and to discover it after the fact in the event it is accomplished, there exists a cooperative international program to periodically inspect nuclear fuel assemblies in storage throughout the world and to maintain an accounting of the spent nuclear fuel contained in such assemblies.

Diversion of spent nuclear fuel could be, for example, by outright theft of a fuel assembly. This type of diversion is readily detectable. A more difficult problem in terms of detection is posed by more sophisticated types of diversion wherein the removal of spent fuel might be concealed in some manner. For example, an irradiated fuel assembly might be removed and replaced with either an empty fuel assembly or a fuel assembly containing a dummy fuel material. Conceivably, the contents of a particular fuel assembly could even be removed and replaced with a dummy material. In view of these possibilities, a method has been sought by which irradiated fuel assemblies in storage ponds may be routinely inspected in situ to determine whether they have been replaced or altered in any way.

Such a method is disclosed in the U.S. patent application Ser. No. 151,870 of Dowdy et al., filed May 21, 1980, which is hereby incorporated by reference. In accordance with the method disclosed therein, a measurement is made of the intensity of Cerenkov radiation produced by a fuel assembly in a storage pond.

Cerenkov radiation appears as a blue glow in the water around an irradiated fuel assembly. It is produced by the interaction between gamma radiation, which is emitted by radioactive fission products in the spent fuel, and the surrounding water. Since the radioactive fission products decay with time, the intensity of both the gamma radiation and the induced Cerenkov radiation progressively decrease with time. The rate at which both types of radiation decreases depends largely on two factors; the length of time the fuel assembly was in the reactor core, and the average power level at which the reactor was operated during such time. As a result, each fuel assembly or set of fuel assemblies associated with a particular fuel cycle has a predictable pattern of progressively decreasing Cerenkov radiation emission, which pattern extends over a period of years after the assembly has been removed from the reactor core. At any time during this period, the actual level of Cerenkov radiation from a given fuel assembly can be measured and compared with the predicted level for the assembly. Thus, the pattern of Cerenkov radiation emission provides a basis for periodically inspecting the fuel assembly to ascertain that it has not been altered or replaced. Moreover, the pattern of Cerenkov radiation emission for each fuel assembly is, to some extent, unique, and thus provides a basis for ascertaining the identity of the fuel assembly.

As discussed more fully in the Dowdy et al. application, a measurement of the Cerenkov radiation intensity of a particular fuel assembly is best taken along vertical coolant channels which are located between the fuel rods and which extend the full length of the fuel assembly. The Cerenkov glow is brightest in these channels and is relatively free of light from nearby fuel assemblies. Also, the glow in the coolant channels, when viewed end on, represents an average, or integrated, intensity for the entire length of the fuel assembly. To take such a measurement thus requires an instrument that can be aligned and focused on the coolant channels where the Cerenkov glow is brightest.

The actual measurement of Cerenkov radiation from a large number of fuel assemblies poses certain other requirements, particularly where it is sought to make such measurements quickly, efficiently, and routinely by an inspector in the field. For example, the large number of fuel assemblies in storage around the world makes it imperative that an instrument for this purpose be portable, reliable and efficient. Also, it is well known that the Cerenkov glow from a fuel assembly diminishes to a level barely perceptible to the unaided eye within a few months or years, so that some form of image intensification may be required to enable a portable instrument to be focused on a region of relatively high Cerenkov radiation intensity where a measurement is to be taken. Further, it is desirable to have a portable instrument which can be focused on a region of maximum Cerenkov radiation intensity, and which can simultaneously obtain a measurement of the Cerenkov radiation intensity while so focused. All of this must be accomplished from a bridge above the storage pond, a position on the order of 30 feet above the tops of the submerged fuel assemblies.

The above-referenced application of Dowdy et al. discloses several types of instruments that have been used to practice the method. However, none of those instruments is portable. More importantly, none of those instruments provides the capability to obtain an intensity measurement at the same time as the instrument is aimed and focused on a particular fuel assembly.

Accordingly, it is the object and purpose of the present invention to provide a portable instrument for inspecting an irradiated nuclear fuel assembly in a water-filled storage pond by measurement of the induced Cerenkov radiation associated with the fuel assembly.

It is also an object and purpose of this invention to provide such an instrument having image intensifying capability, whereby an operator can focus the instrument on a region of highest Cerenkov radiation intensity which may be nevertheless invisible to the unaided eye.

It is a further object of this invention to provide a portable instrument which attains the foregoing objects and purposes, and with which an operator can obtain Cerenkov radiation intensity measurements while simultaneously focusing the instrument on a selected region of highest Cerenkov radiation intensity.

SUMMARY OF THE INVENTION

To achieve the foregoing and other objects, and in accordance with the purposes of the present invention as embodied and broadly described herein, there is provided an instrument for measuring the intensity of Cerenkov radiation produced by an irradiated nuclear fuel assembly submerged in a water-filled storage pond. The instrument comprises an image intensifier and a photometer which are operable concurrently by means of a beam splitter and field lens assembly. The image intensifier operates to produce an electronically amplified image of a field of view seen through the field lens, thereby enabling an operator to view submerged nuclear fuel assemblies and their associated Cerenkov glow in a fuel storage pond, and further enabling the operator to focus the instrument on selected regions where the Cerenkov glow is brightest.

The beam splitter divides the beam from the field lens into two substantially identical sub-beams. One sub-beam is directed to the photometer and the other sub-beam is directed to the image intensifier. As a result, the two sub-beams are applied simultaneously to the image intensifier and the photometer, such that a photometer measurement can be taken while an operator is manually focusing the instrument on a selected region of the fuel storage pond.

In accordance with other aspects of the invention, the sub-beam directed to the photometer may be preferably passed through a central aperture, which may be of variable size, such that the photometer is responsive only to a portion of the beam which represents a selected central area of the field of view of the field lens. Further in this regard, the image intensifier may include a biocular viewer provided with graticules which indicate to the operator that portion of the field of view actually transmitted to the photometer.

In accordance with other preferred aspects of the invention, the photometer may consist of a photomultiplier having a continuously variable output. In this embodiment the instrument further includes a hold switch which enables the operator to freeze the digital output of the photomultiplier once the instrument has been properly focused on a selected field of view.

The entire instrument may be advantageously assembled as a compact, hand-portable unit suitable for routine transport and use in the field. With such a unit, an operator can quickly yet accurately inspect a large number of fuel assemblies stored at a reactor site anywhere in the world.

These and other aspects of the present invention will be apparent to one of ordinary skill in the art on reading the following detailed description of a preferred embodiment, taken with the accompanying drawings.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE PREFERRED EMBODIMENT

Figure 1:
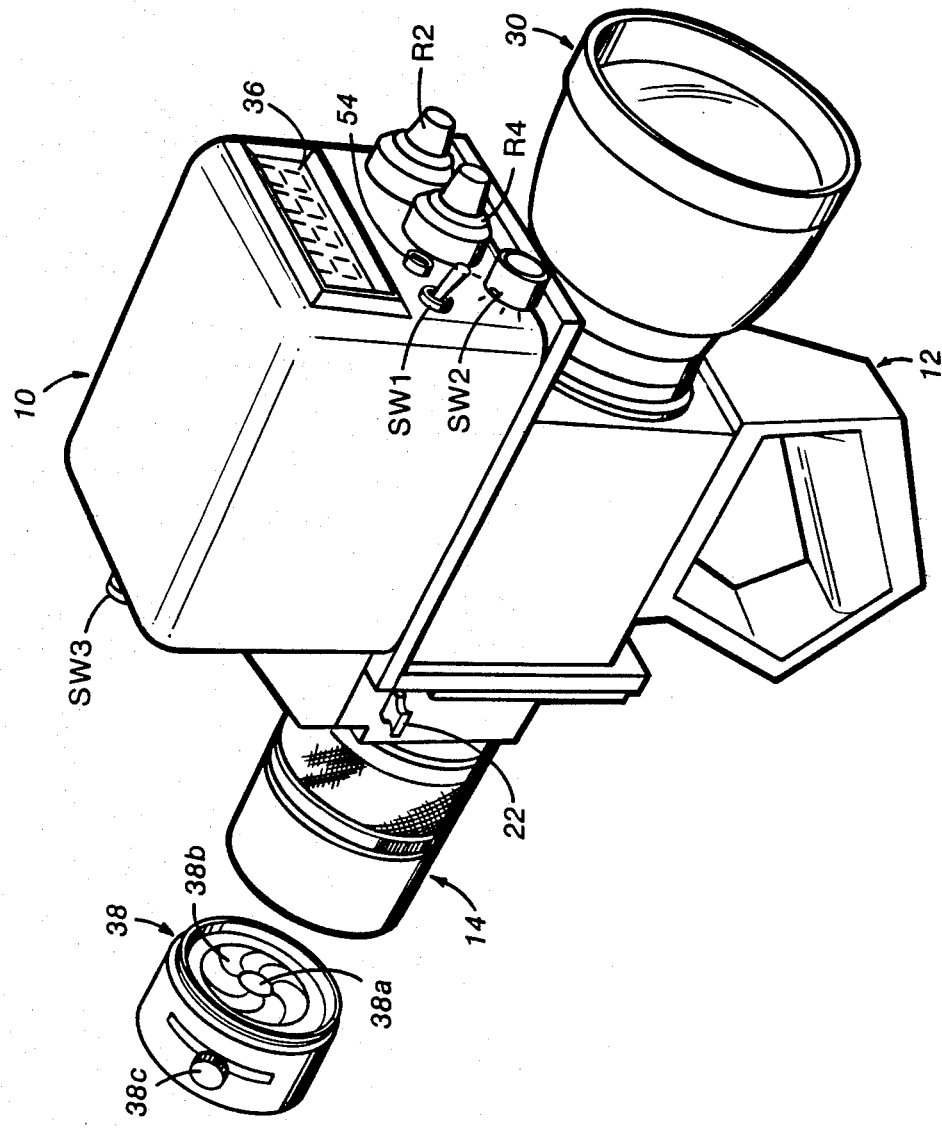
FIG. 1 is a pictorial isometric view of the preferred embodiment of the instrument of the present invention.

FIG. 1 illustrates pictorially the preferred embodiment of the instrument of the present invention. The various components of the instrument are contained in a compact housing 10 which may be conveniently supported and aimed by means of a handle 12. At the forward end of the housing 10 is an objective field lens assembly 14. The lens assembly 14 is a variable focal length lens assembly, or zoom lens, which permits the operator to select the size of the field of view contained in the beam passed through the lens assembly 14.

Figure 2:
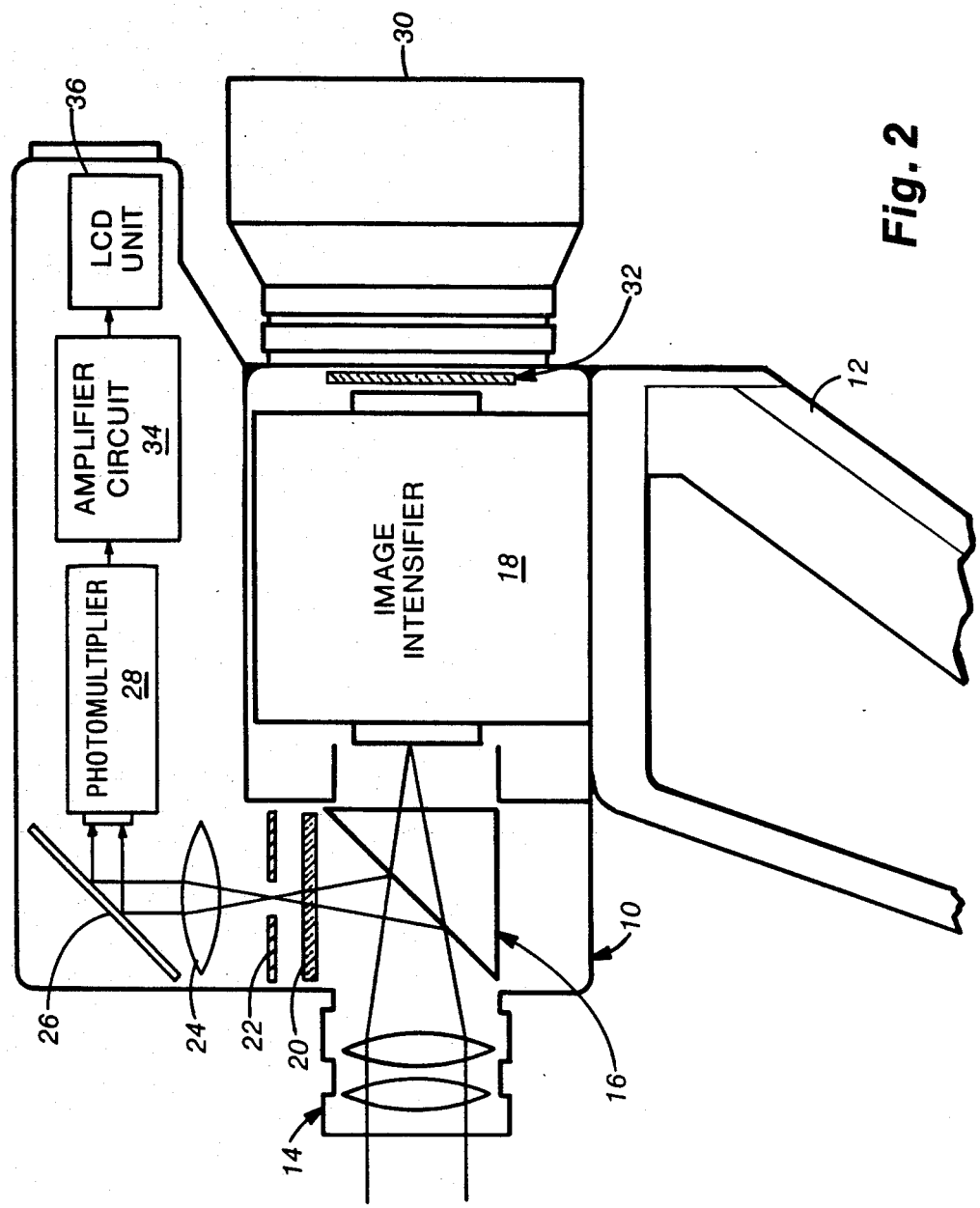
FIG. 2 is a schematic functional diagram of the preferred embodiment shown in FIG. 1.

Referring to the schematic functional diagram of FIG. 2, the beam passed through the lens assembly 14 impinges on a prismatic beam splitter 16. The beam splitter 16 divides the impinging beam into two sub-beams of substantially equal intensity. One sub-beam is transmitted to an image intensifier 18 located behind the beam splitter 16. The other sub-beam is directed upwardly through a neutral density filter 20, an aperture 22 and a relay lens 24. From the relay lens 24 the sub-beam is reflected by a 45° mirror 26 and is collected by a photomultiplier tube 28.

The image intensifier 18 electronically amplifies the image contained in the sub-beam transmitted from the beam splitter 16. The amplified image is viewable by means of a biocular viewer 30 located at the rear of the instrument. A suitable image intensifier and associated biocular viewer are commercially available, for example, from Varo, Inc. of Garland, Tex., under the trade name Varo Noctron V (Model No. 9878).

The biocular viewer 30 can be removed and replaced with a monocular eye piece or an adapter for a 35 mm camera. Between the biocular viewer 30 and the image intensifier 18 there is interposed a transparent graticule plate 32 which is inscribed with a set of numbered concentric circles centered on the optical axis of the instrument. These circles are seen when an operator is looking through the biocular viewer 30 and indicate the portion of the field of view that is transmitted to the photomultiplier tube 28. More specifically, the sizes of the various circles on the graticule plate 32 correspond respectively to the sizes of apertures in a set of removable aperture plates 22 which are insertable between the beam splitter 16 and the relay lens 24. By changing the aperture plates the operator can select the portion of the field of view which is transmitted to the photomultiplier tube 28. In the preferred embodiment, the aperture sizes represent 1/20, 1/10 and 1/5 of the field of view. Since all of the light transmitted to the photomultiplier tube 28 is collected to produce an electrical signal representative of the average, or integrated, intensity of the collected beam, the use of a set of variable apertures 22 enables the operator to take reproducible readings over a predetermined area of the top of a nuclear fuel assembly, taking into account variations in the depth of the fuel assembly within a storage pond as well as variations in the distance of the instrument above the surface of the pond. In this regard, the set of variable diameter apertures 22 complements the variable focal length objective lens assembly 14, with the removable apertures 22 providing a course adjustment and the zoom lens assembly 14 providing a fine adjustment as to the field of view actually transmitted to the photomultiplier tube 28.

The neutral density filter 20 is one member of a set of four interchangeable filters. The filters are of varying light transmittances so as to enable intensity measurements to be taken over a wide range of illumination levels. In the preferred embodiment, successive filters in the set vary by a factor of ten in transmittance, with the first filter consisting merely of an open window (100% transmittance) and the other three filters having transmittances of 10, 1.0 and 0.1 percent, respectively.

In the preferred embodiment the photomultiplier tube 28 is a 12 stage photomultiplier tube having a 25 mm aperture and having a nominal gain of approximately 1 million. The tube 28 is identified commercially as a VI 9826 photomultiplier tube. The output of the photomultiplier tube 28 is applied to an amplifier circuit 34. The amplifier circuit 34 includes a low noise operational amplifier (described further below) having an integration time of approximately 0.5 second. The output of the amplifier circuit 34 is scaled to between 0 and 2 V dc, and is digitized and displayed by means of a liquid crystal display (LCD) unit 36. The output of the amplifier circuit 34, as presented by the LCD unit 36, may be frozen by means of a hold switch (not shown in FIG. 2). The hold switch enables the operator to aim and focus the instrument on a selected fuel assembly in a storage pond and take a reading of the Cerenkov light intensity at the same time.

A special lens cap 38 (shown in FIG. 1) is provided for calibrating the instrument in the field. Built into the lens cap 38 is a carbon-14/phosphor light source 38a which provides a substantially constant, low level of illumination. The lens cap further includes an iris 38b which can be opened and closed by an external locking lever 38c when the cap is on the lens assembly. The iris 38b permits the instrument to be both zeroed (with the iris closed) and calibrated (with the iris open) in a simple two-step operation. Also, the iris is closed to protect the carbon-14/phosphor light source when the lens cap is removed from the instrument. In practice, the instrument is calibrated by first placing the lens cap on the instrument with the iris closed, and adjusting the LCD display 36 to zero. The iris is then opened and the gain of the amplifier circuit 34 is adjusted until the output of the LCD display 36 is set at a predetermined number corresponding to a calibration intensity for the light source.

Figure 3:
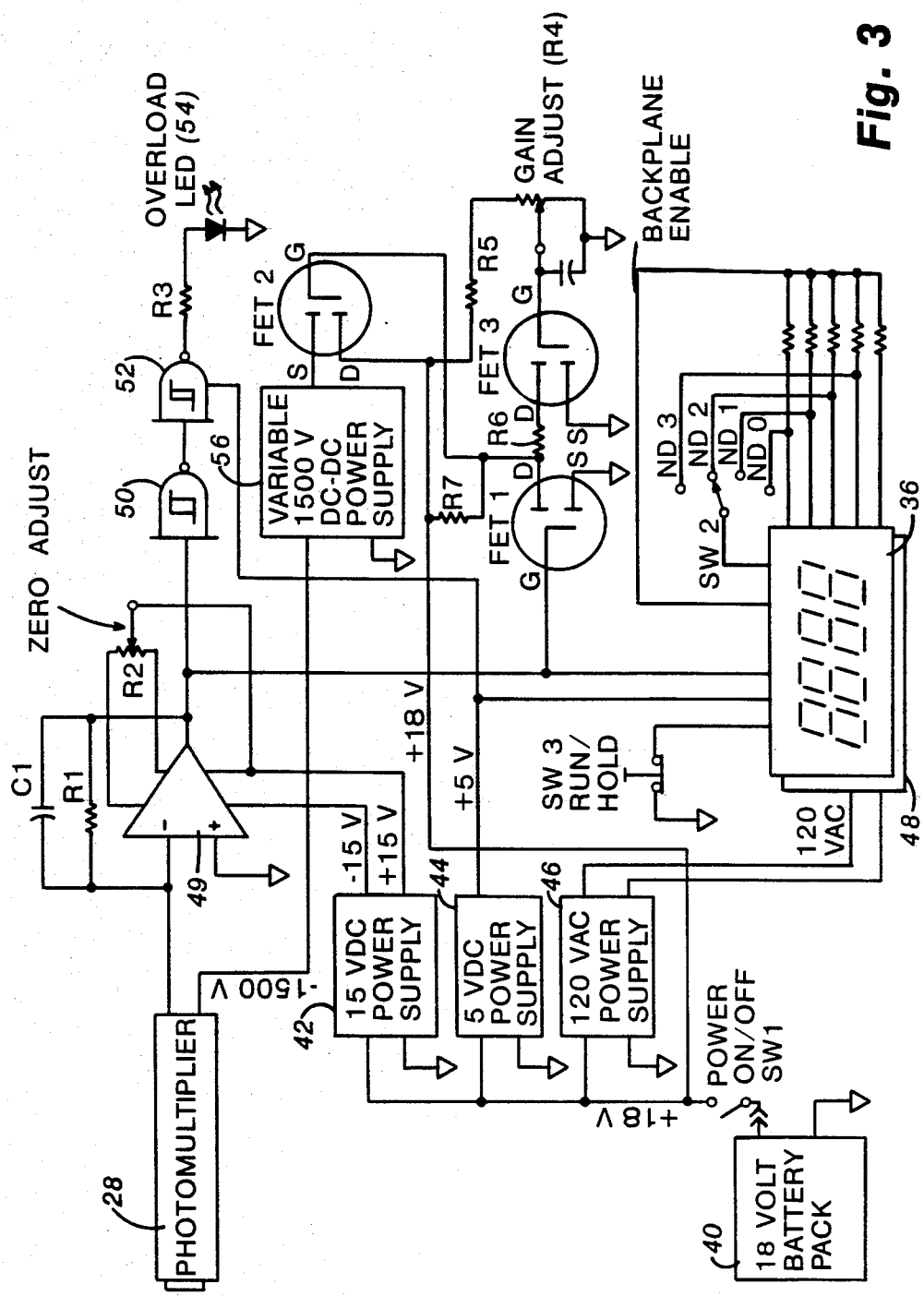
FIG. 3 is a schematic diagram of the electrical circuitry associated with the photomultiplier tube used in the preferred embodiment.

FIG. 3 illustrates in greater detail the electrical circuity associated with the photomultiplier tube 28, the amplifier circuit 34 and the LCD unit 36. The photomultiplier tube 28 and the amplifier circuit 34 are powered by an 18-volt battery pack 40 which may be carried separately from the remainder of the instrument. The battery pack 40 drives a 15 volt dc power supply 42, a 5 volt dc power supply 44 and a 120 volt ac power supply 46. The output of the 120 volt ac power supply 46 is applied to an electroluminescent panel 48 which illuminates the LCD unit 36.

The output of the 15 volt dc power supply 42 drives an amplifier 49, which in the preferred embodiment is an OP-07AJ operational amplifier. A 0.47 $\mu$f capacitor C1 and a 1.0 megohm resistor R1 interposed in parallel across the input and output terminals of the amplifier 49 set the integration time of the amplifier 49 at approximately 0.5 second. The output of amplifier 49 is zeroed by means of a 10K variable trimming resistor R2.

The output signal of the amplifier 49 has a nominal range of 0 to 2 volts. This signal is applied to a pair of 746513 inverters 50 and 52 which are connected in series. The inverters 50 and 52 actuate an overload indicator LED 54 through a 120 ohm resistor R3 whenever the output signal exceeds 1.5 volts. Actuation of the LED 54 indicates to the operator that the photomultiplier tube 28 is nearly saturated and that a darker filter 20 should be selected before light intensity measurements are taken.

The photomultiplier tube 28 is driven by a variable output 1500 volt dc power supply 56. The photomultiplier tube 28 is protected against current overloads by a feedback circuit which includes a pair of field effect transistors FET 1 and FET 2 (each of which is a commercially available VN98AK FET). The 18 volt input to the 1500 volt power supply 56 passes through the drain (D) and source (S) of FET 2 and is thereby modulated by the potential applied to the gate (G) of FET 2. The gate of FET 2 is connected to the drain of FET 1, and the gate of FET 1 is connected to the output of the amplifier 49. At high light levels and corresponding high levels of the output signal from amplifier 49, the FETs 1 and 2 reduce the input to the power supply 56 and thereby reduce the potential applied to the photomultiplier tube 28.

The gain of the photomultiplier 28 is controlled through a third field effect transistor (FET 3, also identified as a VN98AK) and a 1 kilohm variable resistor R4. The 18 volt dc power supply signal is applied to the gate of FET 3 through a 5 kilohm resistor R5 and the variable resistor R4. The drain of FET 3 is connected to the gate of FET 2 through a 10 kilohm resistor R6, such that the FET's 2 and 3 and the variable resistor R4 modulate the output of the 1500 volt power supply 56.

The output signal from the photomultiplier tube 28 is also applied to the LCD unit 36, which in the preferred embodiment includes an integral A/D converter and digital voltmeter. Such a unit is commercially available under the identifying tradename Texmate PM-45X. The LCD unit 36 represents a 0-2 volt input signal as a four-digit number. The position of the decimal point in the four-digit display is selected by means of a 4-position switch SW 2. Since the value of the displayed number varies by a factor of 10 with each shift in the position of the decimal point, the four positions of the decimal point selection switch SW 2 conveniently correspond with the light attenuating effects of the four neutral density filters 20. Thus, in the preferred embodiment the decimal selection switch SW 2 is labeled and utilized as a filter selection switch, with the switch being set at the position corresponding to the filter being used.

The numerical display of the LCD unit 36 may be temporarily frozen by means of a normally closed RUN/HOLD switch SW 3 which is located at the front of the instrument. This switch is actuated by the operator when the appropriate aperture 22 and filter 20 have been selected and the instrument has been properly aimed and focused.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for inspecting irradiated nuclear fuel assemblies in a water-filled storage pond by measurement of induced Cerenkov radiation, comprising:
   field lens means for providing a beam containing an image of a selected field of view;
   beam splitting means for dividing said beam into first and second substantially identical sub-beams;
   image intensifying means for electronically amplifying said first sub-beam and forming an amplified image viewable in real time of said field of view; and
   photometer means positioned to receive said second sub-beam and provide an electrical signal representative of the integrated intensity of said sub-beam, said photometer means including digital readout means for providing a numerical display of the value of said intensity.

2. The apparatus defined in claim 1 further comprising variable diameter aperture means interposed optically between said beam splitting means and said photometer means for transmitting only a selected circuit portion of said second sub-beam to said photometer means.

3. The apparatus defined in claim 2 wherein said variable diameter aperture means comprises one member of a set of interchangeable fixed diameter aperture plates.

4. The apparatus defined in claim 3 wherein said field lens means comprises a variable focal length objective field lens assembly.

5. The apparatus defined in claim 4 wherein said viewing means of said image intensifying means includes a graticule plate inscribed with a set of centered concentric circles which correspond to the respective fields of view transmitted through said fixed diameter aperture plates to said photometer means.

6. The apparatus defined in claim 1 further comprising means for selectively holding the output of said photometer means to thereby temporarily retain an output reading.

7. The apparatus defined in claim 1 wherein said beam splitting means comprises a beam splitting cube.

8. The apparatus defined in claim 1 further comprising a removable lens cap having a carbon-14/phosphor light source contained therein for calibrating the apparatus in the field.

9. The apparatus defined in claim 1 wherein said viewing means of said image intensifying means comprises a biocular viewer.

10. The apparatus defined in claim 1 wherein said photometer means comprises a high gain photomultiplier tube.

11. The apparatus defined in claim 10 further comprising electrical feedback control circuit means for protecting said photomultiplier tube against current overloads at high light levels.

12. The apparatus defined in claim 10 further comprising a removable neutral density filter interposed between said beam splitting means and said photomultiplier tube, said filter comprising one member of a set of interchangeable neutral density filters of varying transmittances.

* * * * *